Sept. 11, 1934.                 C. P. SCHMIDT                    1,973,112
                         METHOD OF FORMING STEEL WHEELS
                              Filed Dec. 7, 1931
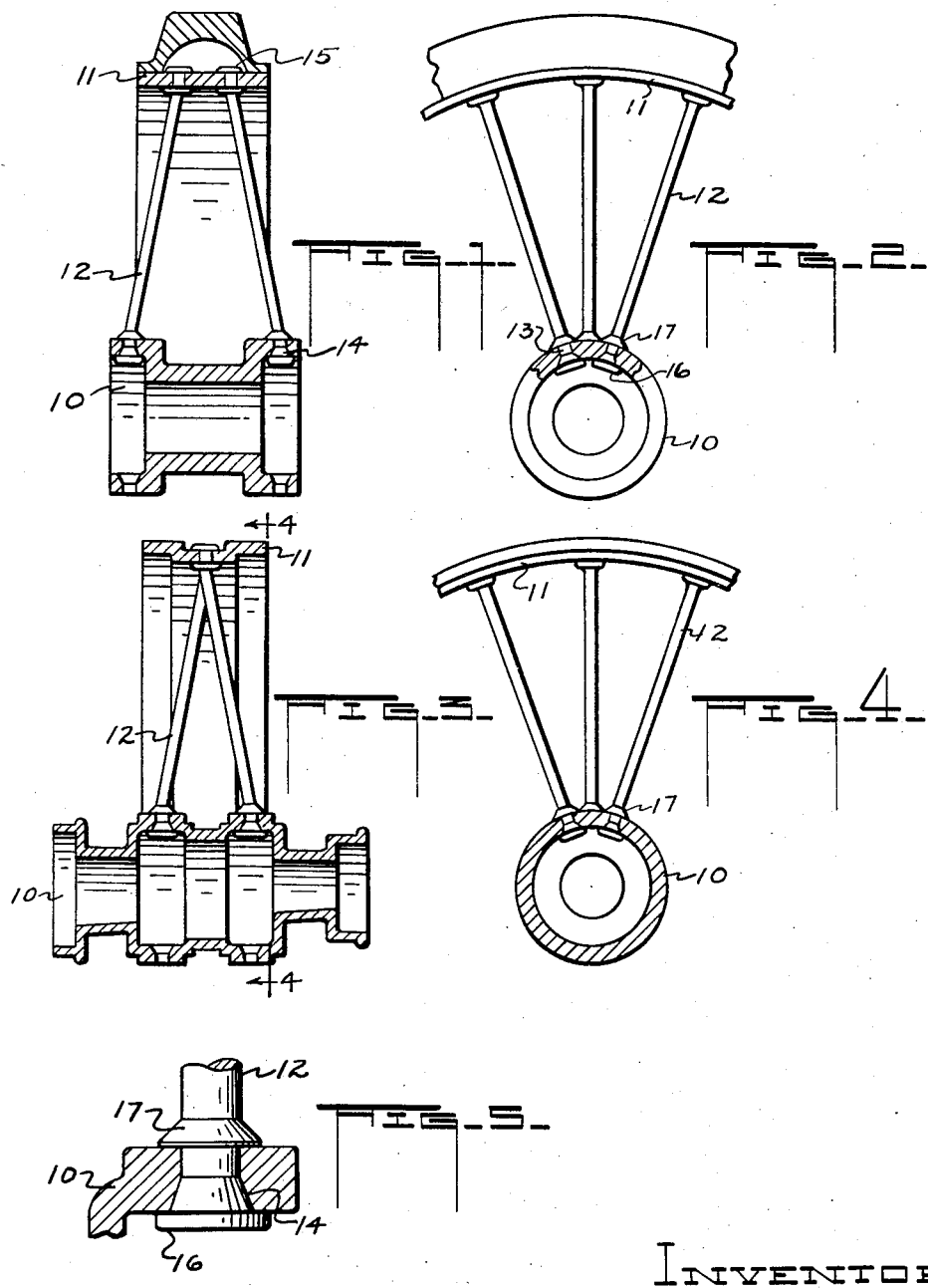

Patented Sept. 11, 1934

1,973,112

UNITED STATES PATENT OFFICE 1,973,112

METHOD OF FORMING STEEL WHEELS

Christ P. Schmidt, Havana, Ill.

Application December 7, 1931, Serial No. 579,358

2 Claims. (Cl. 29—159.02)

This invention relates to steel wheels and more particularly to the method of attaching the spoke portions thereof to the hubs.

One of the objects of the invention lies in the fashioning of a steel wheel in which the spoke portions are attached to the hub by a method which insures thereafter a tight fit between the spoke and hub.

Another object lies in the method of attaching spokes to the hub portions of steel wheels, which results in a non-loosening fit between the spoke and hub.

Still another object lies in the method of attaching spokes to hubs to prevent any possible loosening of the spoke and hub.

A further object lies in the method of attaching hot forged spokes to the hub portions of steel wheels, including the drilling of an inwardly tapering hole in the hub prior to the connection of the spoke with the hub.

A still further object lies in the method of attaching spokes to hub portions of steel wheels, including first drilling the hub with a partial inward taper, then inserting the hot forged spoke in the drilled opening, and finally upsetting the head of the spoke on the inside of the hub and forming a shoulder upon the outside of the hub.

Further objects will appear in the following specification, taken in connection with the annexed drawing, in which—

Fig. 1 is a cross-sectional view showing applicant's method of attaching hot forged spokes to hub portions of steel wheels;

Fig. 2 is a fragmentary elevational view, partially in section;

Fig. 3 is a cross-sectional view, similar to Fig. 1, showing the application of the method to a different type of steel wheel;

Fig. 4 is a cross-sectional view on the line 4—4 of Fig. 3; and

Fig. 5 is an enlarged fragmentary detail showing the hot forged spoke finally connected to the hub portion.

Before referring specifically to the drawing, it might be stated that for many years in the steel wheel art, the spoke portions have been attached to the hubs in a conventional and well known manner. This method comprises the drilling of the hub portion slightly larger than the diameters of the spokes; the spokes are then forged and inserted in the drilled openings in the hub. The ends of the spokes are then upset in a manner to maintain the spoke in the hub and a shoulder is formed upon the outside of the hub. This method has been used almost universally in the attachment of spokes to hub portions of steel wheels. However, this method is attended with certain disadvantages in that upon the cooling of the forged end of the spoke there is a certain contraction of the metal and a shrinkage within the hole. The upset and shoulder portion of the hubs tend to draw together but not sufficiently to equalize the shrinkage within the hole. Many wheels have been constructed in a satisfactory manner with this method, but in many instances the spokes have become loosened in the hub. Such loosening results in the leakage of grease, whereupon the spokes become very loose and the wheel soon breaks down.

Applicant now presents a method of attaching hot forged spokes to hubs which is the result of a lengthy period of experimentation and development in this particular field. As a matter of fact, applicant is associated with one of the largest manufacturers of steel wheels and has been for many years directly connected with the industry.

Referring specifically to the drawing, the steel or cast hub 10 is conventional as far as steel wheels of this character are concerned. The ordinary rim or tire 11 is connected to the hub by means of the plural spoke members 12. The inner ends of the spokes are obviously connected to the hub and in the present instance this connection is made in a novel and extremely satisfactory manner to accomplish the result, namely, of forming a non-loosening fit between the spoke and hub.

The hubs 10 are drilled in the plural manner shown in the drawing at 13. It will be noticed, however, that these holes have a partial inward taper 14 and that the inner ends of the spokes are also slightly expanded to fill this tapered portion as well as the remaining portion of the drilled openings. The outer ends of the spokes 15 are secured to the tire in the ordinary manner.

With respect to the method of forming the wheel, the hub is set up in the usual manner preparatory to the insertion of the spokes. The inner ends of the spokes, which are obviously of slightly less diameter than the drilled openings, are forced into the drilled openings in the hub, with the inner ends extending within the interior of the hub. Tools are now applied simultaneously to the inner ends of the spokes, as well as to that portion of the spokes which lies immediately adjacent the outside of the drilled openings. These tools operate to form the head or upset portion 16 upon the inner end of the spoke. The shoulders 17 upon the outside of the hub are, as stated before, likewise formed simultaneously by such tools.

It will be remembered that these operations are accomplished when the inner ends of the spokes are hot. It will be noted that the upset portion tends to spread the metal into the tapered portion of the drilled hub openings. Now, upon the cooling of the metal and the consequent shrinkage thereof, the upset portion and the shoulders will have the usual tendency to draw together. Any shrinkage of the spoke metal within the drilled opening will be equalized, due to the tapering of the drilled openings by the tendency of the upset and shoulder portions to draw together; in other words, any shrinkage between the shoulder and upset portion will tend to wedge more firmly the spoke metal into the tapered portion of the drilled hub openings.

It is believed, in view of the above, that applicant's method of attaching forged spokes to hub portions of steel wheels is quite obvious and that the distinguishing feature of this method lies in the particular fashioning of the drilled openings of the hub in such manner that the forged spokes will be so connected thereto as to prevent any possible loosening of the spoke in the hub. This method has overcome the disadvantages of the previous and well known methods of attaching spokes to hubs, and applicant's employer has been able to provide a guaranteed steel wheel.

What I claim is:

1. The method of securing spokes in the hubs of metal wheels comprising first aperturing the walls of the hubs in a parallel manner a substantial distance inwardly from the exterior surface of the hub and forming a substantial taper on the interior surface of the aperture adjacent the interior surface of the hub, second inserting a heated spoke end through the aperture and finally upsetting the heated spoke end on both sides of the aperture and within the aperture whereby continued cooling causes a wedging movement of that part of the spoke occupying the tapered portion of the aperture.

2. The method of securing spokes in the hubs of metal wheels comprising first aperturing the walls of the hubs in a parallel manner a substantial distance inwardly from the exterior surface of the hub and forming a substantial taper on the interior surface of the aperture adjacent the interior surface of the hub, second inserting a heated shouldered spoke end through the aperture and finally upsetting the heated spoke end on the interior side of the hub wall with the shoulder portion resting upon the exterior side in such a manner that the portion of the spoke within the taper is upset whereby continued cooling causes a wedging movement of that part of the spoke occupying the tapered portion of the aperture.

CHRIST P. SCHMIDT.